US007165758B2

(12) United States Patent
Kanzler

(10) Patent No.: US 7,165,758 B2
(45) Date of Patent: Jan. 23, 2007

(54) SNOW-TRAIL GROOMING VEHICLE HAVING A CABLE WINCH THEREON AND A METHOD FOR CONTROLLING THE CABLE WINCH

(75) Inventor: Helmut Kanzler, Voehringen (DE)

(73) Assignee: Kaessbohrer Gelaendefahrzeug AG, Laupheim (DE)

( * ) Notice: Subject to any disclaimer, the term of this patent is extended or adjusted under 35 U.S.C. 154(b) by 0 days.

(21) Appl. No.: 10/728,369

(22) Filed: Dec. 4, 2003

(65) Prior Publication Data

US 2004/0173784 A1 Sep. 9, 2004

(51) Int. Cl.
*B66D 1/00* (2006.01)
*B62D 57/00* (2006.01)
*A63C 19/10* (2006.01)

(52) U.S. Cl. ........................ 254/323; 254/267; 180/7.5; 37/219

(58) Field of Classification Search ................ 254/267, 254/328, 323; 180/9.1, 9.23, 7.5; 37/196, 37/197, 219–229, 266
See application file for complete search history.

(56) References Cited

U.S. PATENT DOCUMENTS

| | | | | |
|---|---|---|---|---|
| 3,357,510 A * | 12/1967 | Jourdan | 180/7.5 |
| 4,093,034 A * | 6/1978 | Curley et al. | 180/53.4 |
| 4,200,052 A * | 4/1980 | Cunningham et al. | 114/230.21 |
| 4,353,424 A | 10/1982 | Schenck et al. | |
| 4,365,927 A | 12/1982 | Schenck | |
| 5,072,530 A | 12/1991 | Goller | |
| 6,276,449 B1 * | 8/2001 | Newman | 166/53 |
| 6,585,232 B1 | 7/2003 | Rechenmacher et al. | |
| 2001/0017366 A1 | 8/2001 | Rechenmacher | |
| 2002/0079145 A1 * | 6/2002 | Kanzler et al. | 180/6.48 |
| 2002/0156574 A1 * | 10/2002 | Fortin | 701/213 |

FOREIGN PATENT DOCUMENTS

| | | |
|---|---|---|
| EP | 1118580 | 7/2001 |
| EP | 1182409 A1 | 2/2002 |
| JP | 56057542 | 5/1981 |

OTHER PUBLICATIONS

European Search Report dated Mar. 11, 2005 (3 pages).

* cited by examiner

*Primary Examiner*—Emmanuel Marcelo
*Assistant Examiner*—Evan H. Langdon
(74) *Attorney, Agent, or Firm*—Flynn, Thiel, Boutell & Tanis, P.C.

(57) ABSTRACT

A snow-trail grooming vehicle has a driving chain or track system and a cable assist pulling system having a cable winch. A method for controlling the cable winch includes the steps of detecting the speed of the driving chain, detecting the speed of the cable, comparing the detected speed of the driving chain and the detected speed of the cable, and determining a desired value for the speed of the cable, then controlling the cable winch to attain the desired value for the speed of the cable.

11 Claims, 1 Drawing Sheet

SNOW-TRAIL GROOMING VEHICLE HAVING A CABLE WINCH THEREON AND A METHOD FOR CONTROLLING THE CABLE WINCH

FIELD OF THE INVENTION

The invention relates to a snow-trail grooming vehicle having a cable winch thereon and a method for controlling the cable winch.

BACKGROUND OF THE INVENTION

A device for the automatic control of the pulling force of a cable for a snow-trail grooming device is known from the European Patent Application EP 1 118580 A1, where a pressure in the hydrostatic drive of the snow-trail grooming vehicle and an angle of the cable relative to the vehicle are detected. Using these detected magnitudes, a desired value for the pulling force of the cable is determined. The thus obtained desired value is compared with a detected actual value of the pulling force of the cable and the pulling force is controlled to the desired value in a closed control system. The pressure in the hydrostatic drive is separately detected according to the pressure on the forward side of the drive and according to the pressure on the rearward side of the drive. When the winch cable pulls, for example, forwardly in traveling direction and at the same time a high pressure bears on the forward side of the drive, then the desired value for the winch pulling force is chosen correspondingly higher in order to relieve the drive. Whereas when a high pressure bears on the rearward side of the drive during a cable pull in a forwardly traveling direction, then this means that the cable winch works against the drive. The winch pulling force should be reduced in this case. If, when traveling uphill, a drive chain or track suddenly loses traction, then the pressure on the forward side of the drive is automatically reduced. This results in a reduction of the pulling force of the cable even though, based on the occurring slip, a higher pulling force of the cable would be needed.

A quickly reacting and reliable control of a cable winch is to be achieved with the invention.

According to the invention a method for controlling a cable winch of a snow-trail grooming vehicle is provided with the following steps:

- detecting a chain or track speed or a magnitude proportional to the chain or track speed,
- detecting a cable speed or a magnitude proportional to the cable speed,
- comparing the detected chain or track speed and the detected cable speed or the magnitudes proportional thereto, and
- determining a desired value for the cable speed or the magnitude proportional thereto taking into consideration the comparison result for controlling the cable winch.

By utilizing a chain or track speed and a cable speed for controlling the cable winch, a quick and reliable control can be realized since the control of the cable winch occurs principally independently from the pulling force of the cable. This is particularly advantageous in the case of long cables, which are used for snow-trail grooming vehicles, since with long cables, due to the at all times existing cable elasticity, the tension in the cable is subjected to great fluctuations. In the case of a loss of traction of a driving chain or track, the measured chain speed is increased so that also the cable speed is at least on short notice increased.

Thus, it can be assured that when the driving chains or tracks lose traction the pulling force of the cable winch is increased on short notice in order to guarantee a steady forward movement of the snow-trail grooming vehicle.

A further development of the invention takes into consideration, when determining the desired value, a detected actual pulling force in the cable and a specifiable highest value for the pulling force.

A pulling force limitation of the cable can in this manner be taken into consideration and it can be assured that a maximum permissible pulling force is not exceeded. If necessary, the permissible highest value can be specified, for example, according to environmental conditions, age of cable, type of cable and also type of vehicle.

A further development of the invention detects a chain or track speed and a cable winch speed.

A speed of the driving chains or tracks and a speed of a cable drum or a guide roller with known diameter can be detected in a simple and reliable manner and is proportional with respect to the chain or cable speed.

A further development of the invention provides that the cable speed or its magnitude proportional thereto is detected in accordance with its amount and its direction relative to a traveling direction or a longitudinal axis of the snow-trail grooming vehicle.

A consideration of the cable pull angle is sensible, for example, when a cable winch pulls at an angle with respect to the traveling direction or with respect to the longitudinal axis of the snow-trail grooming vehicle. This is the case when, for example, in the case of flat intermediate pieces, the cable is to be kept taut.

A further development of the invention provides that, when determining the desired value, an angle of slope between the traveling direction or the longitudinal axis of the vehicle and the horizontal and a direction of the cable speed relative to the traveling direction are taken into consideration.

A cable winch control in dependency of the traveling direction on a slope can occur in this manner. For example, when traveling downhill and when the direction of pull is against the traveling direction, the desired value for the cable speed is chosen lower or equal to the chain or track speed in order to achieve a braking action. When traveling uphill and with a pulling direction of the cable in traveling direction, the desired value for the cable speed is chosen greater or equal to the chain or track speed in order to maintain a pulling force in the cable and to support the drive. The cable is basically supposed to be kept taut and under tension in all traveling situations.

A slip of the chains or tracks of the snow-trail grooming vehicle is detected and the detected slip is taken into consideration when determining the desired value according to a further development of the invention.

For example, when noticing an excessive slip at the driving chains or tracks it is possible to increase a desired value for the cable speed so that the pulling force of the cable is increased and the snow-trail grooming vehicle is pulled over the critical area with the help of the cable winch.

The basic problem of the invention is also solved by providing a method for controlling a cable winch of a snow-trail grooming vehicle comprising the following steps:

- detecting a traveling speed above ground of the snow-trail grooming vehicle according to direction and amount,
- detecting a cable speed according to direction and amount or a magnitude proportional to the cable speed, comparing the detected traveling speed above ground and the detected cable speed or the magnitude proportional thereto, and determining a desired value for the cable speed or the magnitude proportional thereto for controlling the cable winch taking into consideration the comparison result.

A traveling speed above ground and the cable speed can be directly compared since the cable of a cable winch is anchored at terrain-fixed points. A traveling speed above ground can be determined with good precision, for example, by means of a satellite navigational system alone or by coupling of several navigational systems.

The basic problem of the invention is also solved by providing a snow-trail grooming vehicle having a cable winch for carrying out the inventive method, which has means for detecting a chain or track speed, a magnitude proportional thereto and/or a traveling speed above ground, means for detecting a cable speed or a magnitude proportional thereto, means for comparing the detected cable speed and the detected chain or track speed or the magnitudes proportional thereto and/or the traveling speed above ground, and means for determining a desired value for the cable speed taking into consideration the comparison result.

BRIEF DESCRIPTION OF THE DRAWINGS

Further characteristics and advantages of the invention result from the claims and the following description of one preferred embodiment of the invention in connection with the drawings, in which:

DETAILED DESCRIPTION

Figure 1:
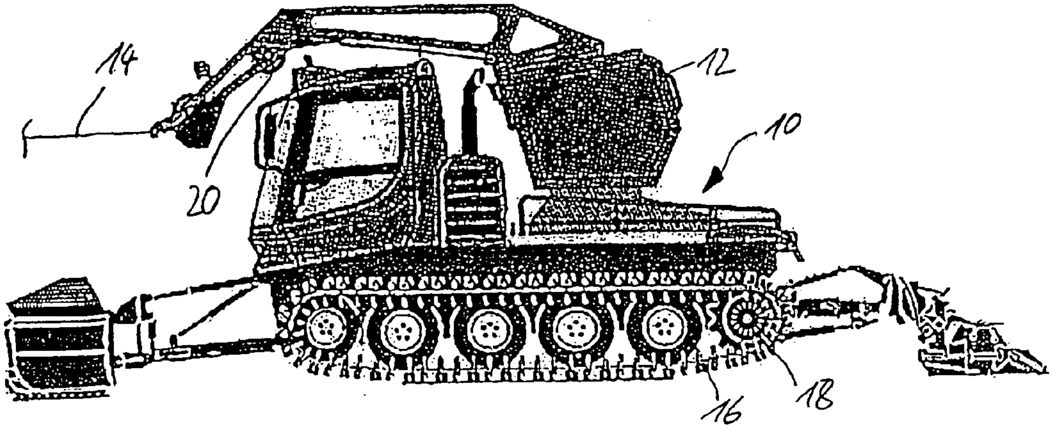
FIG. 1 is a side view of an inventive snow-trail grooming vehicle having thereon a cable winch.

FIG. 1 illustrates an inventive snow-trail grooming vehicle 10 which is equipped with a so-called overhead cable winch 12. The overhead cable winch 12 is rotatably fastened on an undercarriage of the snow-trail grooming vehicle 10 so that a direction of pull of the cable winch 12 can be adjusted essentially as desired with respect to the traveling direction of the snow-trail grooming vehicle 1. The cable winch 12 is utilized, for example, on very steep slopes which are to be groomed. After anchoring the cable in the terrain, the snow-trail grooming vehicle 10 can work a slope, for example, by traveling up and down it without necessitating a new re-anchoring or shifting of the pull cable 14 of the cable winch 12.

A traveling speed of the snow-trail grooming vehicle 10 is determined by a rotational speed of its driving chain or track 16 and possibly occurring slip. Based on the known diameter of the drive gears 18 for the driving chains or tracks 16, it is possible to determine the rotational speed of the driving chains or tracks 16 via a speed detection of the drive gears 18.

The pull cable 14 should at all times be under tension during the operation of the winch. In the case of the inventive cable-winch control, a cable speed of the pull cable 14 is for this purpose detected, for example, by detecting the speed of a guide roller 20 having a constant diameter. When detecting the speed of a cable drum, the changing drum diameter due to layers of wound-up cable must, if necessary, be taken into consideration. Besides the detection of the traveling speed of the snow-trail grooming vehicle 10 and of the cable speed of the pull cable 14, a monitoring of the pulling force of the pull cable 14 is moreover provided in an actually conventional manner. Thus, it is possible to recognize and possibly prevent pulling forces which are detrimental for the lifespan of the cable.

Figure 2:
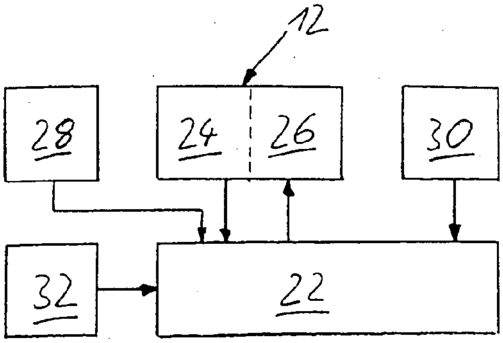
FIG. 2 illustrates a block diagram of a control device for carrying out the inventive method.

The schematic block diagram of FIG. 2 illustrates elements, which are provided in the snow-trail grooming vehicle 10 of FIG. 1, for carrying out the inventive method. A central control system 22 receives data from various sensors and emits control signals to the cable winch 12 in order to control the cable speed of the pull cable 14. The cable winch 12 has sensors 24, which detect a speed of a cable guide roller with a conventional diameter and transfers the speed to the central control system 22. Moreover the sensors 24 also detect an angle of the direction of pull of the cable with respect to a longitudinal axis of the snow-trail grooming vehicle 10 and transfer the measured angles also to the control system 22. The cable winch 12 has moreover a drive motor 26, for example, a hydraulic motor, which is controlled through control signals from the control system 22.

Further input signals are received by the control system 22 from a sensor 28, which detects a speed of the drive gear 18 of the driving chain or track 16. Based on the known diameter of the drive gear 18, it is possible for the control system 22 to determine from the speed of the drive gear 18, which speed is delivered by the sensor 28, a rotational speed of the driving chain or track 16. In the same manner it is possible for the control system 22 to determine a cable speed from the cable roll speed delivered by the sensors 24.

Thus, the cable speed of the pull cable 14, if determined according to the absolute value and direction with respect to the traveling direction of the longitudinal axis of the vehicle and according to the chain or track speed, are determined using the signals of the sensors 24 or 28 in the control system 22. The determined cable speed and the determined chain or track speed are compared and, using the comparison result, a desired value for the cable speed is determined. In order to keep the pull cable 14 taut, the desired value for the cable speed is accordingly corrected upwardly at a chain or track speed, which lies above the cable speed. For example, the chain or track speed increases for a brief period when the driving chain loses traction since suddenly less resistance acts against the chain or track drive. Consequently, the relationship between the chain speed and the cable speed changes, and the control system 22 raises the desired value for the cable speed. The drive motor 26 subsequently tries to increase the cable speed, which causes the pulling force in the cable to increase. The cable pulling force is in this manner increased on short notice upon the occurrence of slip of the driving chains or tracks 16 in order to pull the snow-trail grooming vehicle 10 over a critical area.

The pulling force in the cable is limited to a maximum permissible value in order to avoid damage to the cable. The force actually acting in the cable is for this purpose detected by means of a pulling force sensor 30 and a corresponding value is transferred to the control system 22. When it is determined within the control system 22 that the pulling force in the cable threatens to exceed the maximum permissible value, the drive motor 26 is controlled accordingly in order to reduce the pulling force in the cable.

Finally it is possible for the control system 22 to receive input signals from a navigational system 32, by means of which a traveling speed of the snow-trail grooming vehicle above ground is determined. For example, a precise determination of the position of a snow-trail grooming vehicle and thus a precise determination of the traveling speed above ground is possible by means of combining several navigational systems, for example satellite navigation, terrestrial position navigation and the like. Since also the pull cable 14 of the cable winch 12 is fastened at non-movable points in the terrain, the traveling speed above ground and a cable speed can be compared directly without having to take slip into consideration.

What is claimed is:

1. In a snow-trail grooming vehicle having a driving chain or track system and a cable assist pulling system having a cable winch, a method for controlling the cable winch comprising the steps of:

providing a central control system and a plurality of sensors for transmitting data to the central control system;

said sensors detecting a speed of the driving chain;

said sensors detecting a speed of the cable;

said central control system comparing the detected speed of the driving chain and the detected speed of the cable; and said central control system determining a desired value for the speed of the cable and controlling the cable winch to attain the desired value for the speed of the cable.

2. The method of claim 1, wherein the step of detecting a speed of the driving chain comprises directly detecting the speed of the driving chain.

3. The method of claim 1, wherein the step of detecting a speed of the driving chain comprises detecting a magnitude proportional to the speed of the driving chain.

4. The method of claim 1, wherein the step of detecting a speed of the cable comprises directly detecting the speed of the cable.

5. The method of claim 1, wherein the step of detecting a speed of the cable comprises detecting a magnitude proportional to the speed of the cable.

6. The method according to claim 1, further comprising the step of detecting a pulling force in the cable and controlling the cable winch to maintain the pulling force below a specifiable highest value for the pulling force.

7. The method according to claim 1, wherein a chain speed and a cable winch speed are detected.

8. The method according to claim 1, wherein the speed of the cable is detected as a magnitude and a direction relative to a traveling direction of the snow-trail grooming vehicle.

9. The method according to claim 1, further comprising the step of determining an angle of slope between a traveling direction of the snow-trail grooming vehicle and the horizontal, and a direction of the speed of the cable relative to the traveling direction, for determining the desired value for the speed of the cable.

10. The method according to claim 1, further comprising the step of determining whether the driving chain of the snow-trail grooming vehicle is slipping, for determining the desired value for the speed of the cable.

11. A method for controlling a cable winch of a snowtrail grooming vehicle, comprising the steps of:

detecting a traveling speed of the snowtrail grooming vehicle over a ground surface according to direction and absolute value;

detecting a speed of a cable wound on the cable winch according to direction and absolute value;

comparing the detected traveling speed and the detected cable speed; and determining a desired value for the cable speed for controlling the cable winch.

* * * * *